United States Patent [19]

Smith et al.

[11] 3,857,815

[45] *Dec. 31, 1974

[54] POLYGLYCOL-MODIFIED PHENOLIC RESINS

[75] Inventors: Harry A. Smith; Erwin H. Kobel, both of Midland, Mich.

[73] Assignee: The Dow Chemical Company, Midland, Mich.

[ * ] Notice: The portion of the term of this patent subsequent to Apr. 3, 1990, has been disclaimed.

[22] Filed: July 5, 1973

[21] Appl. No.: 376,755

Related U.S. Application Data

[63] Continuation-in-part of Ser. No. 151,545, June 9, 1971, abandoned.

[52] U.S. Cl.................. 260/51.5, 161/262, 260/58, 260/831, 260/49
[51] Int. Cl.................................................. C08g 5/18
[58] Field of Search............................ 260/51.5, 58

[56] References Cited
UNITED STATES PATENTS

| | | | |
|---|---|---|---|
| 1,283,706 | 11/1918 | Edison | 260/51.5 X |
| 1,994,753 | 3/1935 | Cherry | 260/51.5 X |
| 2,082,306 | 6/1937 | Sutter | 260/51.5 |
| 2,666,037 | 1/1954 | Ingrassia | 260/17.2 |
| 3,010,919 | 11/1961 | MacKinney et al | 260/17.2 |
| 3,025,255 | 3/1962 | Lambuth | 260/29.3 |
| 3,156,670 | 11/1964 | Soldatos | 260/58 |
| 3,342,776 | 9/1967 | Lambuth | 260/57 |
| 3,444,137 | 5/1969 | Higginbottom et al. | 260/51.5 |
| 3,714,121 | 1/1973 | Kobel et al. | 260/51.5 |
| 3,725,349 | 4/1973 | Smith et al | 260/58 |

OTHER PUBLICATIONS

Chemistry of Synthetic Resins, Ellis, pp. 287–288, 332, 1935, Vol. I.
Phenolic Resins, Whitehouse, 1967, p. 82.

*Primary Examiner*—Howard E. Schain
*Attorney, Agent, or Firm*—David H. Thurston

[57] ABSTRACT

Phenolic-aldehyde resoles are modified by reaction with a polypropylene glycol or a polybutylene glycol before curing to obtain cured resins with improved resistance to impact. Preferably, the modified resole is reacted with at least one aromatic amine. The polyglycol-modified resins are particularly useful as adhesives for wood.

11 Claims, No Drawings

POLYGLYCOL-MODIFIED PHENOLIC RESINS

CROSS-REFERENCE TO RELATED APPLICATION

This is a continuation-in-part of our copending application Ser. No. 151,545 filed June 9, 1971 now abandoned.

BACKGROUND OF THE INVENTION

This invention relates to a method for modifying phenol-aldehyde resins to obtain improved physical properties by reacting an intermediate resole with a polyalkylene glycol. It also relates to the resinous products thereby produced, to the method of bonding using such resins, and to the bonded products, particularly bonded wood products.

Phenolic-aldehyde resins, usually largely or entirely made from phenol and formaldehyde as reactive components, are valuable adhesives, particularly for wood, and large quantities are used for making water-resistant plywood or other bonded wood products. Conventional resins of this type have certain disadvantageous properties, for example, curing or hardening of the intermediate stage resin by further reaction with formaldehyde may be undesirably slow, even at elevated temperatures, and the cured resins tend to be brittle with low resistance to impact.

Intermediate resoles and novolacs have been modified by incorporation of a small amount of high molecular weight polyethylene glycol, but the cured resins produced from such modified intermediates have increased sensitivity to water, thereby sacrificing one of the primary advantages of phenol-aldehyde resins.

SUMMARY OF THE INVENTION

It has now been found that improved phenolic-aldehyde resins having substantially improved toughness and resistance to impact are obtained by reacting an intermediate resole resin with a polypropylene glycol or a polybutylene glycol having an average molecular weight in the range of about 400 to about 10,000. The reaction is carried out at about 50°C. to the boiling point of the reaction mixture using about 0.5–40 per cent of polyglycol based on the weight of resole.

DETAILED DESCRIPTION

While any polypropylene glycol, polybutylene glycol, or mixed polyalkylene glycol as defined in the specified molecular weight range is operable in the invention to give some improved properties, best results are obtained with such polyglycols having an average molecular weight of about 750–5,000. The terms polypropylene glycol and polybutylene glycol are used herein generically to mean any polyol which consists essentially of propyleneoxy or butyleneoxy units or a mixture of the two, that is, a polyglycol made entirely or essentially entirely of propyleneoxy and/or butyleneoxy units with any suitable initiator as the base. A mixture of a polypropylene glycol and a polybutylene glycol can be used. In other words, the term mixture as applied herein to the polyglycol reactant means both physical mixtures and chemically combined mixed units. This class of materials includes adducts of propylene oxide and butylene oxide and initiator polyols such as ethylene glycol, butanetriol, glycerol, butylene glycol, and trimethylene glycol as well as polypropylene glycol or polybutylene glycol. Also included are such adducts wherein the alkylene oxide added is a mixture of one or both of propylene and butylene oxides with up to about 10 mole per cent of another oxide such as ethylene oxide or styrene oxide. A polyglycol consisting essentially of propyleneoxy units is preferred.

Substantially any resole, that is, a phenolic-aldehyde resin produced by basic or neutral catalyst initiated reaction of a phenol with up to about 2.2 mole equivalents of aldehyde and having reactive alkylol groups can be used in the present invention. The phenol reactant is preferably phenol itself or its mixture with up to 90 mole per cent of a substituted phenol having at least two of the ring positions ortho and para to the phenolic hydroxyl group open and capable of reaction with an aldehyde. In some cases, a substituted phenol as defined can be used alone. Such phenols include m-cresol, resorcinol, p-tertbutylphenol, and the like. Representative aldehydes include formaldehyde, acetaldehyde, propionaldehyde, furfuraldehyde, benzaldehyde, and mixtures thereof. The resole is preferably that produced by reacting about 0.5–1.1 mole of formaldehyde with a mole of phenol in the presence of a neutral or basic catalyst.

The term basic catalyst essentially defines the alkali metal bases, ordinarily the hydroxides and carbonates. The term neutral catalyst is used to define compounds which in water solution have a pH in the approximate range of 4–10. These compounds are typically the oxides, hydroxides, and weak acid salts of Group II metals. Illustrative basic and neutral catalysts, therefore, are compounds such as sodium hydroxide, potassium carbonate, calcium acetate, magnesium acetate, zinc hydroxide, or other neutral or basic metal oxide, hydroxide, or organic acid salt.

The resole-polyglycol reaction can be carried out at any temperature between about 50°C. and the boiling point of the reaction mixture. The reaction is most conveniently run at about reflux temperature with a reaction time of 0.1–10 hours.

The polyglycol-modified resole can be cured or hardened directly by reaction with formaldehyde, paraformaldehyde or other formaldehyde source such as hexamethylene tetramine or a mixture of formaldehyde and a polyepoxide such as the diglycidyl ether of bisphenol A or an epoxidized novolac. A polyepoxide alone can be used as the curing agent when the resole has been reacted with an arylamine as described below. Where the resole has been made with sufficient excess formaldehyde, it is then a thermoset resin which is curable by heat alone. However, resins of superior properties having both short and conveniently adjustable cure times and high impact strength are obtained by first reacting the modified resole with either an aryl monoamine such as aniline, toluidine, or anisidine, or a difunctional arylamine such as m-hydroxyaniline or phenylenediamine. Preferably the modified resole is reacted with a combination of amines of both these classes according to the description in our copending application Ser. No. 138,746, filed Apr. 29, 1971, entitled "Arylamine-Modified Phenolic Resins," now U.S. Pat. 3,714,121.

Aryl monoamines include aniline, ar-(lower alkyl)aniline, lower alkoxyaniline, and mixtures thereof where lower alkyl and lower alkoxy refer to radicals of 1–4 carbon atoms. Difunctional arylamines are defined as having the formula

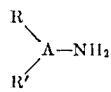

wherein A represents a benzene ring, a naphthalene nucleus, or a dicyclic moiety of the formula

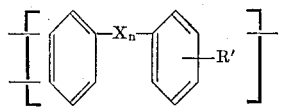

wherein X is oxygen, lower alkylidene, S, $SO_2$, or NH, $n$ is zero or one, R is OH or $NH_2$, and R' is H, lower alkyl, or lower alkoxy. Preferred difunctional amines include m-hydroxyaniline, m-phenylenediamine, p,p'-oxydianiline, p,p'-methylenedianiline, and p,p'-diaminodiphenylamine. Other such amines which can be used as p,p'-sulfonyldianiline, p,p'-ethylidenedianiline, p,p'-thiodianiline, 4,4'-methylenebis(m-toluidine), 4,4'-butylidenebis(m-anisidine), benzidine, o-tolidine, 1,5-diaminonaphthalene, 1-amino-2-naphthol and the like. A mixture of two or more such difunctional amines can also be used.

The arylamine-resole reaction can be carried out at any temperature between about 50°C. and the boiling point of the reaction mixture. The reaction is most conveniently run at about reflux temperature, usually for a reaction time of 0.5–5 hours.

Preferably, the polyglycol-modified resole is reacted with a combination of aniline or substituted aniline and a difunctional arylamine. Improved resin products are obtained when about 0.1–1.3 moles of aniline or substituted aniline are employed per mole of difunctional amine and the total amine reactants amount to about 0.05–0.5 g. mole per 100 grams of resole. Preferred proportions of amines are about 0.8–1.2 moles of monoamine per mole of difunctional amine and about 0.25–0.45 g. mole of total amines per 100 grams of resole.

Although the combined aryl monoamine and difunctional amine can be reacted with the resole in one step, preferably the amines are reacted separately, with the aniline or monosubstituted aniline-resole reaction carried out first and then the difunctional amine reacted with the product under generally similar conditions.

The resinous products are cured or hardened to an infusible, insoluble state by further reaction with an aldehyde, an epoxide, or a combination of the two. Preferred curing agents are formaldehyde or a combination of formaldehyde and a polyepoxide such as a polyglycidyl ether of bisphenol A, an epoxidized novolac, or the diglycidyl ether of a polyglycol. Amine-modified resins are curable in this way at room temperature with curing times ranging from about a minute up to about an hour depending upon the particular resin system and the kind of curing agent or combination of curing agents used. The curing time at room temperature, or at any other particular temperature, is conveniently varied by using different ratios of epoxide to formaldehyde in the curing agent, the ratio of resin to the formaldehyde in such a curing agent composition being the most critical factor. The curing time generally varies according to the epoxide/$CH_2O$ weight ratio. This ratio can vary between all epoxide and all formaldehyde but ratios of 10/1 to 1/1 usually are most preferred.

Resin/curing agent ratios can be varied from 20/1 to 1/3 but are preferably between 4/1 to 1/1.5 by weight. Cure time also varies according to dilution of the curing agent in an inert solvent. Cure time varies inversely with the curing temperature. A curing temperature below normal temperature, as low as 40°C., for example, is also operable for amine-modified resins although the cure time is then somewhat longer. Slightly faster cures are obtained at higher temperatures, at 150°C., for example.

Examples 1–9

A predominantly ortho substituted resole prepolymer was prepared by heating at reflux temperature a mixture in the proportions of 79.7 g. of 90 percent phenol, 18.8 g. of 95 percent paraformaldehyde, 0.7 g. of water, and 0.8 g. of calcium acetate monohydrate. The mixture was stirred for 1 hour as it was heated to reflux temperature, then stirring was continued for an additional hour at that temperature. One hundred gram samples of the product were mixed with quantities of polypropylene glycol as indicated and these mixtures were then heated at reflux temperature until a viscosity of about 2,270 centistokes at 25°C. was reached, usually about 2–5 hours of additional heating time.

These glycol-modified prepolymers were then further reacted with aromatic amine as follows:

A. To 100 g. of glycol-modified prepolymer there was added 10 g. of m-hydroxyaniline (mHA) and the mixture was heated at reflux temperature for 2 hours, then cooled and stored for testing.

B. To 160 g. of glycol-modified prepolymer there was added 22.7 g. of aniline and the mixture was heated at reflux for one hour. Then 26.7 g. of m-hydroxyaniline was added and the mixture was heated at reflux for another hour. The resin product was then cooled and stored for testing.

Ten gram samples of the resins described in (A) and (B) were cured at room temperature by adding 5 g. of a 7:1 mixture of a bisphenol A-epichlorohydrin adduct having a molecular weight of about 380 and a 55 percent methanolic solution of formaldehyde. The gel time for each sample was determined by ASTM method D—2471—68 and the samples were tested as wood adhesives using a 24 hour cure at room temperature and 2–2.5 psi pressure and then testing via standard methods ASTM D—1344—57 (a cross-lap test) and ASTM-D—950—57 (impact strength). Douglas fir was the wood used in all tests and the test data are ranges or averages found in each test for a set of three samples. The results are listed in the table below. Examples 1 and 4 are comparative examples showing the results obtained when the resoles are cured with no modification by polyglycol.

TABLE 1

| Example | Resin | Polypropylene Glycol ave. mol. wt. | wt. % | Gel Time min. | Cross Lap Bond Strength p.s.i. | Impact Strength ft. lbs/sq. in. |
|---|---|---|---|---|---|---|
| 1 | mHA modified | none | | 1.0 | 210–230 | 6.0 |
| 2 | mHA modified | 400 | 10 | 3.5 | 210–245 | 5.9 |

TABLE I—Continued

| Example | Resin | Polypropylene Glycol ave. mol. wt. | wt. % | Gel Time min. | Cross Lap Bond Strength p.s.i. | Impact Strength ft. lbs/sq. in. |
|---------|-------|-----|-----|------|---------|------|
| 3 | mHA modified | 4000 | 10 | 3.0 | 180–210 | 10 |
| 4 | Aniline – mHA | none | | 27 | 140–290 | 6.5 |
| 5 | Aniline – mHA | 400 | 10 | 22 | 210–260 | 10 |
| 6 | Aniline – mHA | 4000 | 1 | 38 | 290–345 | 10.0 |
| 7 | Aniline – mHA | 4000 | 5 | 25 | 190–225 | 11.9 |
| 8 | Aniline – mHA | 4000 | 10 | 27 | 205–240 | 9.6 |
| 9 | Aniline – mHA | 4000 | 20 | 31 | 170–270 | 8.5 |

Examples 10–13

A resole prepolymer was prepared by reacting phenol with paraformaldehyde in the presence of calcium acetate using the proportion and procedure described in Examples 1–9. The resole product was then heated at reflux temperature after addition of 20 percent by weight of polypropylene glycol of 4,000 ave. mol. wt. until a viscosity of 2,270 centipoises at 25°C. was reached.

The glycol-modified product was divided into four portions which were separately reacted with 0.15 g. mole of aniline or p-anisidine and then with 0.153 g. mole of difunctional aromatic amine as described under Section B of Examples 1–9. Samples of the resin products were cured with the epoxide-formaldehyde mixture as described under the above examples and gel times and wood adhesive properties were determined also as described under Examples 1–9. These results are listed in Table 2.

TABLE 2

| | Amine Components | | Gel Time | Cross Lap Test | Impact Strength |
|---------|------|------|------|------|------|
| Example | Monofunctional | Difunctional | Minutes | Strength, p.s.i. | ft. lbs./sq. in. |
| 10 | Aniline | p,p'-Methylenedianiline | 102 | 275–315 | 13–15 |
| 11 | Aniline | p,p'-Oxydianiline | 78 | 190–275 | 13–15.5 |
| 12 | p-Anisidine | m-Hydroxyaniline | 32 | 255–285 | 9.5–>16 |
| 13 | Aniline | m-Phenylenediamine | 16 | 265–270 | 10–14 |

Examples 14–18

Predominantly ortho substituted resoles were reacted with 10 percent by weight polypropylene glycol and the glycol-modified prepolymers were reacted with aniline and m-hydroxyaniline using the procedure and proportions of Examples 5 and 8. Corresponding resins using 10 percent by weight of polyethylene glycol of various average molecular weights as the polyglycol additive were also made up in the same way. These resins were cured and tested in the cross lap test as previously described.

Samples of each were also subjected to a variation of the cross-lap test referred to as the vacuum pressure test (CS-253-63) wherein the bonded wood pieces were exposed to at least 635 mm. Hg. vacuum for 30 minutes while submerged in water at 25°C., then exposed to about 4 atmospheres of air pressure under the same time and temperature conditions. The wet samples were then tested by the cross-lap test procedure. Douglas fir was the wood used in all tests and the test data are ranges or averages found in each test for a set of three samples. In each test, the percentage of wood failure at break point was estimated visually. The results are listed in Table 3. Somewhat lower strengths for the polyethylene glycol modified resins of comparative Examples 16–18 were found in both tests and the vacuum pressure test in particular indicated substantially lower resistance to water. In practice, these resins would be unsuitable as adhesives for wood subject to exterior exposure or damp conditions.

TABLE 3

| | | Gel Time Min. | Cross Lap | | Vac. Pressure | |
|---------|-----------|------|------|------|------|------|
| Example | Polyglycol* | | Strength (psi) | % Wood Failure | Strength (psi) | % Wood Failure |
| 14 | P-400 | 22 | 210–260 | 100 | 120–210 | 100 |
| 15 | P-4000 | 25 | 205–240 | 100 | 145–235 | 100 |
| 16 | E-400 | 41 | 180–200 | 60–75 | 140–150 | 5 |
| 17 | E-4000 | 43 | 180–200 | 60–75 | 140–150 | 0–50 |
| 18 | E-20,000 | 47 | 170–200 | 60–75 | 100–150 | 5–30 |

*Designated as polyethylene glycols (E) and polypropylene glycols (P) of the indicated average molecular weights.

We claim

1. A process for making an improved phenolic aldehyde resin which comprises reacting by contacting at about 50°C. to the boiling point of the reaction mixture a resole resin with about 0.5–40 weight percent based on the weight of resole of polyalkylene glycol having an average molecular weight of about 400–10,000, wherein said polyalkylene glycol is essentially a polypropylene glycol, a polybutylene glycol, or a mixture thereof and the resole is the neutral or basic catalyst-initiated reaction product of about 0.5–2.2 moles of formaldehyde with a mole of a phenol and wherein the polyglycol-modified resole is reacted at about 50°C. to the boiling point of the reaction mixture with about 0.05–0.5 gram mole per 100 grams of resole of at least one aromatic amine of the group consisting of aniline, ar-(lower alkyl)aniline, lower alkoxyaniline, and a difunctional aromatic amine of the formula

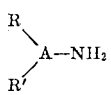

wherein A represents a benzene ring, a napthalene nucleus, or a dicyclic moiety of the formula

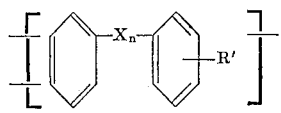

wherein X is oxygen, lower alkylidene, S, $SO_2$, or NH, $n$ is zero or one, R is OH or $NH_2$, and R' is H, lower alkyl, or lower alkoxy.

2. The process of claim 1 wherein the resole is the neutral catalyst-initiated reaction product of phenol and the polyalkylene glycol is a polypropylene glycol.

3. The process of claim 2 wherein the aromatic amine is a difunctional aromatic amine.

4. The process of claim 2 wherein the aromatic amine reactant is a mixture of about 0.8–1.2 moles of aniline and a mole of difunctional aromatic amine.

5. The process of claim 4 wherein the difunctional aromatic amine is m-hydroxyaniline.

6. The polyalkylene glycol and aromatic amine modified phenolic resin product of the process of claim 1.

7. The resin of claim 6 wherein the resole is the neutral catalyst-initiated reaction product of phenol and the polyalkylene glycol is essentially a polypropylene glycol.

8. The amine-modified resin of claim 7 wherein the aromatic amine reactant is a difunctional amine.

9. The amine-modified resin of claim 7 wherein the aromatic amine reactant is a mixture of about 0.8–1.2 moles of aniline and a mole of a difunctional aromatic amine which is m-hydroxyaniline, oxydianiline, methylenedianiline or phenylenediamine.

10. The resin of claim 9 wherein the difunctional amine is m-hydroxyaniline.

11. The reaction product of the resin of claim 6 and a phenolic resin curing agent which is a polyepoxide, a source of formaldehyde, or a mixture thereof.

* * * * *